United States Patent
Kim et al.

(10) Patent No.: US 8,116,810 B2
(45) Date of Patent: Feb. 14, 2012

(54) METHOD OF TRANSMITTING AND RECEIVING CONTROL INFORMATION OF MULTIMODE MOBILE TERMINAL

(75) Inventors: Yong Ho Kim, Gyeonggi-do (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 562 days.

(21) Appl. No.: 12/298,250

(22) PCT Filed: Apr. 27, 2007

(86) PCT No.: PCT/KR2007/002092
§ 371 (c)(1),
(2), (4) Date: Mar. 6, 2009

(87) PCT Pub. No.: WO2007/126267
PCT Pub. Date: Nov. 8, 2007

(65) Prior Publication Data
US 2010/0061336 A1    Mar. 11, 2010

(30) Foreign Application Priority Data

Apr. 28, 2006 (KR) .................. 10-2006-0038984
Mar. 9, 2007 (KR) .................. 10-2007-0023614

(51) Int. Cl.
H04W 36/00 (2009.01)
H04W 4/00 (2009.01)
H04M 1/00 (2006.01)

(52) U.S. Cl. ............. 455/552.1; 455/436; 455/437; 455/435.2; 370/331

(58) Field of Classification Search .............. 455/418, 455/420, 422.1, 436–444, 447, 450, 509, 455/524–525, 550.1, 552.1, 556.2, 560–561, 455/432.1–432.3, 433–434; 370/331, 329, 370/338, 341, 349
See application file for complete search history.

(56) References Cited

U.S. PATENT DOCUMENTS

| | | | |
|---|---|---|---|
| 6,330,459 B1 * | 12/2001 | Crichton et al. | 455/562.1 |
| 6,725,058 B2 * | 4/2004 | Rinne et al. | 455/553.1 |
| 7,280,811 B2 * | 10/2007 | Sugiyama et al. | 455/168.1 |
| 7,489,930 B2 * | 2/2009 | Aerrabotu et al. | 455/439 |

(Continued)

FOREIGN PATENT DOCUMENTS

EP    1349413 A1    3/2003
(Continued)

OTHER PUBLICATIONS

V. Gupta et al., "Media Independent Handover," IEEE 802.21 Media Independent Handover Services, May 2005, XP-002428336.
(Continued)

*Primary Examiner* — Meless Zewdu
(74) *Attorney, Agent, or Firm* — Lee, Hong, Degerman, Kang & Waimey

(57) ABSTRACT

A multi-mode mobile subscriber station (MSS) composed of several interfaces, and a method for acquiring/updating information in the case of a handover between heterogeneous networks are disclosed. A method for transmitting/receiving control information of a multi-mode mobile subscriber station (MSS) including at least two interfaces, includes: a) requesting first control information, associated with a new access point detected by a link scanning, from a network entity for providing information associated with a specific network; b) acquiring the requested first control information and second control information supplied from the new access point; and c) performing a connection to the new access point according to the first control information and the second control information.

12 Claims, 5 Drawing Sheets

U.S. PATENT DOCUMENTS

| | | | |
|---|---|---|---|
| 7,596,120 B2 * | 9/2009 | Kim et al. | 370/331 |
| 7,710,923 B2 * | 5/2010 | Carlton | 370/331 |
| 2005/0068965 A1 * | 3/2005 | Lin et al. | 370/395.21 |
| 2005/0221824 A1 | 10/2005 | Lee et al. | |
| 2006/0265474 A1 * | 11/2006 | Kim et al. | 709/218 |

FOREIGN PATENT DOCUMENTS

| | | |
|---|---|---|
| GB | 2320653 A | 6/1998 |
| JP | 2006520119 | 8/2006 |
| WO | 2004/079949 | 9/2004 |
| WO | 2005/107379 | 11/2005 |
| WO | 2005/125052 | 12/2005 |
| WO | 2006/001902 | 1/2006 |
| WO | 2006019269 | 2/2006 |

OTHER PUBLICATIONS

Joint Harmonized Contribution, "Media Independent Handover", IEEE 802.21 Media Independent Handover Services, May 2005, XP-002488344.

* cited by examiner

METHOD OF TRANSMITTING AND RECEIVING CONTROL INFORMATION OF MULTIMODE MOBILE TERMINAL

This application is a 371 national stage application of PCT/KR2007/002092, filed on Apr. 27, 2007, which claims the benefit of earlier filing date and right of priority to Korean Application No. 10-2006-0038984, filed on Apr. 28, 2006 and Korean Application No. 10-2007-0023614, filed on Mar. 9, 2007, the contents of which are all hereby incorporated by reference herein in their entireties.

TECHNICAL FIELD

The present invention relates to a multi-mode mobile terminal (also called a multi-mode mobile subscriber station) composed of several interfaces, and more particularly to a method for acquiring/updating information in the case of a handover between heterogeneous networks.

BACKGROUND ART

The present invention relates to a handover between different networks (i.e., heterogeneous networks), discloses a broadband wireless access (BWA) system as an example of a variety of communication systems.

The broadband wireless access (BWA) system and a variety of messages for use in the broadband wireless access (BWA) system will hereinafter be described in detail.

The IEEE 802.16e system based on the international standardization of the broadband wireless access (BWA) system does not include a hierarchical structure (e.g., HLR, VLR, MSC, BSC, RNC), differently from conventional 2G and 3G mobile communication systems. The IEEE 802.16e system includes only a Mobile Subscriber Station (MSS), a Base Station (BS), and an Authentication Service Authorization (ASA). A physical layer (PHY) and a medium access control (MAC) layer are defined between the base station (BS) and the mobile subscriber station (MSS).

FIG. 1 is a structural diagram illustrating the frame of an OFDMA physical layer of the broadband wireless access (BWA) system.

A downlink (DL) sub-frame begins at a preamble used for synchronization and equalization at the physical layer, and includes a broadcast-type DL-MAP message for defining the location and usage of a burst assigned to a downlink (DL) and a UL-MAP message for defining the location and usage of a burst assigned to an uplink (UL), such that it defines an overall frame structure using the UL-MAP and DL-MAP messages.

An example of the DL-MAP message is shown in the following Table 1:

TABLE 1

| Syntax | Size | Notes |
|---|---|---|
| DL-MAP Message Format( ){ | | |
| Management Message Type = 2 | 8 bits | |
| PHY Synchronization Field | Variable | See appropriated PHY sepcification |
| DCD Count | 8 bits | |
| Base Station ID | 48 bits | |
| Begin PHY Specific Section{ | | See applicable PHY section |
| For(i=1;i<=n;i++){ | | For each DL-MAP element 1 to n |
| DL-MAP_IE( ) | Variable | See corresponding PHY specification |
| } | | |
| } | | |

TABLE 1-continued

| Syntax | Size | Notes |
|---|---|---|
| If !(byte boundary) Padding Niddle | 48 bits | Padding to reach byte boundary |
| } | | |
| } | | |

An example of the UL-MAP message is shown in the following Table 2:

TABLE 2

| Syntax | Size | Notes |
|---|---|---|
| UL-MAP Message Format( ){ | | |
| Management Message Type=3 | 8 bits | |
| Uplink Channel ID | 8 bits | |
| UCD Count | 8 bits | |
| Allocation Start Time | 32 bits | |
| Begin PHY Specification Section{ | | See application PHY section |
| for (i=1; i<=n;i++){ | | For each UL-MAP element 1 to n. |
| UL-MAP_IE( ) | variable | See corresponding PHY specification. |
| } | | |
| } | | |
| if !(byte boundary){ Padding Niddle | 4 bits | Padding to reach byte boundary. |
| } | | |
| } | | |

The DL-MAP message defines usages assigned to individual bursts in a downlink interval of the burst-mode physical layer. The UL-MAP message defines the usages of the burst assigned to an uplink interval.

The information element (IE) for constructing the DL-MAP message distinguishes downlink traffic intervals at a user terminal by referring to a DIUC (Downlink Interval Usage Code), a CID (Connection ID), and burst location information (e.g., sub-channel offset, symbol offset, the number of sub-channels, and the number of symbols).

The information element (IE) for constructing the UL-MAP message defines its usage by an Uplink Interval Usage Code (UIUC) for each CID, and defines the location of a corresponding interval by duration information.

In this case, usages for each interval are determined according to UIUC values of the UL-MAP message. Each interval begins at a specific location spaced apart from the beginning point of a previous IE by a duration prescribed in the UL-MAP IE.

The Downlink Channel Description (DCD) message or the Uplink Channel Description (UCD) message is a MAC management message including UL/DL channel parameters of the base station (BS). The DCD or UCD message configured in the form of broadcast data is transmitted to mobile subscriber station (MSS) at intervals of a predetermined period.

The mobile subscriber stations (MSSs) acquire coding/modulation information of each burst from the DCD/UCD messages, and codes/decodes data according to the acquired coding/modulation information.

Each mobile subscriber station (MSS) receives the DCD and UCD messages periodically transmitted from the base station (BS), determines whether channel parameters of the base station (BS) are changed according to the received DCD and UCD messages, and updates the channel parameters according to the DCD/UCD messages.

The UCD message defines not only profile information associated with the coding/modulation scheme of the uplink burst, but also the set of CDMA codes associated with the ranging and band request operation. In addition, the UCD message further defines a back-off time required when an unexpected data collision occurs after the mobile subscriber station (MSS) transmits several codes.

The mobile subscriber station (MSS) compares a Configuration Change Count value with a DCD count value of the DL-MAP message. If it is determined that the Configuration Change Count value is different from the DCD count value of the DL-MAP message, the mobile subscriber station (MSS) determines that the DCD message has been changed to another value. Otherwise, if it is determined that the Configuration Change Count value is equal to the DCD count value of the DL-MAP message, the mobile subscriber station (MSS) determines that the DCD message is equal to a previously-received DCD message.

The DCD message is exemplarily shown in the following Table 3:

TABLE 3

| Syntax | Size | Notes |
|---|---|---|
| DCD Message Format( ) {<br>Management Message Type=1<br>Downlink Channel ID<br>Configuration Change Count<br>TLV Encoded information for<br>the overall channel<br>Begin PHY Specification<br>Section{<br>For (I=1; I<=n;i++){<br>Downlink Burst Profile<br>   }<br> }<br>} | | |

The TLV (Type, Length, Value) encoding information inserted into the above-mentioned DCD message is exemplarily shown in the following Table 4:

TABLE 4

| Name | Type | Length | Value | PHY Score |
|---|---|---|---|---|
| MIH Capability Support | 55 | 1 | 0 = MIH Capability not supported<br>1 = MIH Capability supported | A11 |

In the case of the OFDMA scheme of the broadband wireless access (BWA) system, the mobile subscriber station (MSS) generates a ranging request and an uplink band request using CDMA codes, such that it can adjust an uplink transmission parameter.

The base station configures the set of CDMA codes in the form of broadcast data, and transmits the broadcast-type CDMA codes to the mobile subscriber stations (MSSs). In this case, the set of CDMA codes are designed to generate the ranging and band requests using the uplink channel description (UCD) message.

The mobile subscriber station (MSS) selects a predetermined ranging code suitable for a desired usage from among CDMA codes acquired from the UCD message, and transmits the selected ranging code to the uplink interval assigned for the ranging process.

The UCD message is exemplarily shown in the following Table 5:

TABLE 5

| Syntax | Size | Notes |
|---|---|---|
| UCD Message Format ( ){<br>Management Message Type=0 | 8 bits | |
| Configuration Change Count | 8 bits | |
| Ranging Backoff Start | 8 bits | |
| Ranging Backoff End | 8 bits | |
| Ranging Backoff Start | 8 bits | |
| Ranging Backoff End | 8 bits | |
| TVL Encoded information for the overall channel | variable | |
| Begin PHY Specific Section {<br>For(i=1; i<=n;i++){ | | TVL specific<br>For each<br>uplink<br>burst profile<br>1 to n. |
| Uplink_Burst_Profile<br>  }<br> }<br>} | variable | PHY specific |

The mobile subscriber station (MSS) receives the DL-MAP and UL-MAP messages, and performs the ranging process for a network access procedure.

The present invention relates to a handover between heterogeneous networks, such that the handover technology between the heterogeneous networks will hereinafter be described in detail.

The IEEE 802.21, which is conducting the international standardization of the Media Independent Handover (MIH) between heterogeneous networks, provides a seamless handover and service continuity between the heterogeneous networks, resulting in greater convenience of a user. The basic requirements of the IEEE 802.21 are a MIH function, an event service (ES), and a command service (CS), and an information service.

The mobile subscriber station (MSS) acts as a multi-mode node for supporting at least one interface type, and the interface may be set to any one of the following types i), ii), and iii).

The type (i) indicates a wired-line format such as the 802.3-based Ethernet.

The type (ii) indicates a wireless interface based on the IEEE 802.XX, for example, the IEEE 802.11, the IEEE 802.15, and the IEEE 802.16.

The type iii) indicates an interface defined by the cellular standardization organization such as the 3GPP or 3GPP2.

As stated above, the present invention relates to a handover between heterogeneous networks, such that it supports a handover between various networks capable of providing a wired or wireless interface.

FIG. 2 is a circuit diagram illustrating a multi-mode mobile subscriber station (MSS). In this case, the multi-mode mobile subscriber station (MSS) is denoted by a multi-mode STA in the drawing.

Referring to FIG. 2, the multi-mode MSS includes a physical layer and a MAC layer for each node.

The MIH function of the mobile subscriber station (MSS) acting as a logical entity can interface with individual layers contained in a protocol stack via a service access point (SAP), and at the same time can be located at any location of the protocol stack.

The MIH (Media Independent Handover) must be defined between 802-based interfaces, or must be defined between the 802-based interface and the above-mentioned 802-based interface (i.e., 3GPP or 3GPP2). The mobility-supporting protocol (e.g., mobile IP or SIP (Session Initiation Protocol)) of upper layers must be supported to provide a handover service or seamless service.

The MIH function (MIHF) will hereinafter be described in detail.

The IEEE 802.21 standard can allow a variety of handover methods (e.g., "break before make" or "make before break") to be easily operated.

The MIHF (Media Independent Handover Function) provides upper and lower layers with an asynchronous service and a synchronous service via the defined SAP (Service Access Point). For example, the asynchronous service is a Media Independent Event Service (MIES), and the synchronous service is a Media Independent Command Service (MICS).

The MIHF (Media Independent Handover Function) includes three MIHF services and a media independent handover protocol. The three MIHF services are a Media Independent Event Service (MIES), a Media Independent Command Service (MICS), and a Media Independent Information Service (MIIS).

The media independent event service will hereinafter be described in detail.

The media independent event service acts as information transmitted from a link layer to upper layers. The upper layers can receive the media independent event service information via a registration procedure.

In this case, in order to facilitate the handover by estimating the possibility of generating the handover, each upper layer including the mobility management protocol must receive link layer information indicating that the handover will be generated soon or the handover has just occurred.

The media independent event service can be classified into a link event and an MIH event. The link event begins at the entity of generating events of the lower layers below the 2-layer, and is generally terminated at the MIHF. The MIH event is propagated to upper layers over the S-layer, registered by the MIHF.

The link event or the MIH event can be classified into two types according to propagation areas.

If events are generated from the event source within the local stack, are transmitted to a local MIHF, or are transmitted from the MIHF to the upper layers in an uplink direction, the above-mentioned events are determined to be local events.

Otherwise, if the events are generated from the remote event source, are transmitted to the remote MIHF, and are then transmitted from the remote MIHF to the local MIHF, the above-mentioned events are determined to be remote events.

An example of the event service for the handover between heterogeneous networks will hereinafter be described in detail.

Link_Going_Down

The "Link_Going_Down" event occurs when the 2-layer connection will enter the "Link_Down" status within a specific time, and may be used as a signal for initializing the handover procedure.

The event source parameters (i.e., Local MAC and Remote MAC) are shown in the following Table 6:

TABLE 6

| Name | Type | Destination |
| --- | --- | --- |
| EventSource | EVENT_LAYER_TYPE | Source at which event is generated |
| EventDestination | EVENT_LAYER_TYPE | Destination at which event is received |
| MacMobileTerminal | MAC address | MAC address of mobile subscriber station (MSS) |
| MacOldAccessRouter | MAC address | MAC address of previous access router |
| MacNewAccessRouter | MAC address | MAC address of new access router |
| TimeInterval | Time in msecs | Time at which link will enter "Link_Down" |
| ConfidenceLevel | % | Level at which link will enter "Link_Down" |
| UniqueEventIdentifier | | Used if event rollback is generated |

Link_Detected

The "Link_Detected" event indicates that a new specific link is in a Link-available status. The "Link_Detected" event indicates a possibility that a new base station (BS) or access point may provide the link quality better than that of a current base station (BS) or access point (i.e., a current connection point).

The event source parameters (i.e., Local MAC and Remote MAC) are shown in the following Table 7:

TABLE 7

| Name | Type | Destination |
| --- | --- | --- |
| EventSource | EVENT_LAYER_TYPE | Source at which event is generated |
| EventDestination | EVENT_LAYER_TYPE | Destination at which event is received |
| MacMobileTerminal | MAC address | MAC address of mobile subscriber station (MSS) |
| MacNewAccessRouter | MAC address | MAC address of previous access router |
| MacOldAccessRouter | MAC address | MAC address of new access router |

Link_Parameters_Change

The "Link_Parameters_Change" event occurs when a variation of the link parameter value becomes higher than a specific limit level. The "Link_Parameters_Change" event may include a variety of link-layer parameters (e.g., the link speed, the Quality of Service (QoS), and the encryption value).

The event source parameters (i.e., Local MAC and Remote MAC) are shown in the following Table 8:

TABLE 8

| Name | Type | Destination |
| --- | --- | --- |
| EventSource | EVENT_LAYER_TYPE | Source at which event is generated |
| EventDestination | EVENT_LAYER_TYPE | Destination at which event is received |
| MacMobileTerminal | MAC address | MAC address of mobile subscriber station (MSS) |
| MacAccessRouter | MAC address | MAC address of current access router |
| OldValueOfLinkParameter | | Previous Value of Link pasrameter |
| NewValueOfLinkParameter | | New value of Link parameter |

The media independent command service will hereinafter be described in detail.

The media independent command service determines link status information of the upper layers and link status information of other MIH users, and indicates commands for adjusting optimum operations of the multi-mode device. Also, the above-mentioned commands are transmitted to commands transmitted from upper layers over the 3-layer to lower layers below the 2-layer.

Similar to the above-mentioned media independent event services, the media independent command service is classified into a link command and a MIH command. The link command or the MIH command is classified into a local command and a remote command according to propagation areas. The local MIH command is generated from the upper layers, and is transmitted to the MIHF. For example, the MIHF may be indicative of an MIHF of an upper-layer mobility management protocol or another policy-engine MIHF.

The remote link commands are generated from the MIHF to adjust the lower-layer entities, such that the remote link commands are transmitted to the lower layers (e.g., MAC) or are transmitted from the MIHF to the physical layer (PHY).

The remote MIH command is generated from the upper layers, and is then transmitted to a remote equivalent stack. The remote link command is generated from the MIHF, and is then transmitted to lower layers of the remote equivalent stack.

The information service according to the present invention will hereinafter be described in detail.

The media independent information service (MIIS) provides a hierarchical network (i.e., a heterogeneous network) with a similar framework, such that the user can easily find or select a desired network from among a variety of networks. The MIIS can be accessed by all the networks.

The MIIS includes the following information elements:
Link access parameter
Security mechanism
Neighbor Map
Location
Provide and other Access Information
Cost of Link The MIH capability discovery message and its associated messages will hereinafter be described.

The "MIH_Capability_Discovery.request" message has the following characteristics.

The "MIH_Capability_Discovery.request" message does not include the MIH message payload. The type of the "MIH_Capability_Discovery.request" message is set to "1" using only the MIH header, such that the resultant message is transmitted to a destination. This message may be transmitted to the destination via the 2-layer (i.e., L2 layer) or the 3-layer (i.e., L3 layer).

If the entity for transmitting the above-mentioned "MIH_Capability_Discovery.request" message does not recognize the accurate address of a counterpart entity, and desires to recognize which one of entities within the network has the MIH function, the "MIH_Capability_Discovery.request" message is transmitted as a broadcast message.

Otherwise, although the entity for transmitting the "MIH_Capability_Discovery.request" message recognizes the address of the counterpart entity, and desires to recognize the presence or absence of the MIH function of the corresponding entity, the "MIH_Capability_Discovery.request" message is transmitted as a unicast message.

The "MIH_Capability_Discovery.response" message has the following characteristics.

If the entity for receiving the "MIH_Capability_Discovery.request" message has the MIH function, it answers the "MIH_Capability_Discovery.request" message using the "MIH_Capability_Discovery.response" message.

The "MIH_Capability_Discovery.response" message does not include the MIH message payload in the same manner as in the "MIH_Capability_Discovery.request" message, and the type of the "MIH_Capability_Discovery.response" message is set to "1" using only the MIH header, such that the resultant message is transmitted to a destination. In this case, the above-mentioned response message may also be transmitted via the L2 or L3 layer.

If the "MIH_Capability_Discovery.response" message is transmitted to a destination as described above, the destination address of the MIH header copies the source address of the "MIH_Capability_Discovery.request" message, and is filled with the duplicated source addresses, and the source address is filled with its own address.

The entity having the MIH function may periodically advertise its MIH function via the L2 or L3 layer.

A method for performing the handover between heterogeneous networks will hereinafter be described.

FIG. 3 is a flow chart illustrating a conventional handover procedure.

Referring to FIG. 3, if the multi-mode mobile subscriber station (MSS) is handed over from a wireless LAN access point to the broadband wireless access system, a method for acquiring MIHF performance information of the base station (BS) to which the multi-mode mobile subscriber station (MSS) will be handed over via the DCD message, and a network access procedure are depicted in FIG. 3.

As can be seen from FIG. 3, the MIH of the multi-mode mobile subscriber station (MSS) receives specific information from the link layer at step S301. This specific information indicates that a connection to a current access wireless LAN link will be released after the lapse of a predetermined time. In other words, the mobile subscriber station (MSS) receives a message indicating a release of the connection to a current access point (i.e., IEEE 802.11 of FIG. 3).

If the mobile subscriber station (MSS) recognizes the above-mentioned connection-release status, its MIHF transmits the "Link_going_down" primitive indicating that the connection will be remotely released at the MIH of the current access point at step S302. The above-mentioned "Link_going_down" primitive has been disclosed in Table 6, so that its detailed description will herein be omitted for the convenience of description.

The upper management entity of the mobile subscriber station (MSS) generates a command for scanning another link, such that it can be handed over from a current network to another network using the command. The above-mentioned command is transmitted to a corresponding interface link layer over the MIHF, and scans the actual link at step S303.

The broadband wireless access link scanned by the scan procedure S303 is transmitted to the MIHF via the "Link Detected" primitive at step S304. FIG. 3 shows a specific case in which a new access point is a wireless access link.

Upon receiving available link information, the MIHF or the upper management entity transmits the "Link Connect" command to the broadcast wireless access system link to establish a corresponding link at step S305.

The MAC layer of the base station (BS) broadcasts the DL-MAP and UL-MAP messages to the MAC layer of the mobile subscriber station (MSS) at each frame. Therefore, the mobile subscriber station (MSS) acquires the uplink- or downlink-frame structure, band allocation information, and DIUC and UIUC information, etc.

The MAC layer of the base station (BS) periodically transmits the DCD message including MIHF performance information of the base station (BS) to the mobile subscriber station (MSS). The mobile subscriber station (MSS) compares the DCD count value of the DL-MAP message with the configuration count change value of the DCD message. If it is determined that the DCD count value off the DL-MAP message is different from the configuration count change value of the DCD message, the mobile subscriber station (MSS) updates a current DCD message to a recently-received DCD message at step S307.

The MAC layer of the mobile subscriber station (MSS) transmits the MIHF performance information received by the DCD message to the MIHF or the upper management entity at step S308.

The base station (BS) broadcasts the UCD message including the uplink channel information along with the DCD message at step S309. However, it should be noted that the step S309 may occur prior to the step S308.

The step S309 may have the same operation period as in the step S307, and may transmit the recent UCD message content using the same method as in the step S307.

The mobile subscriber station (MSS) performs a specific process for connecting the L2 layer to the base station (BS) at step S310.

As can be seen from the above-mentioned steps S301~S310, a conventional mobile subscriber station (MSS) is handed over from a current access point to a new access point. In other words, the conventional mobile subscriber station (MSS) performs the handover from the current access point to the new access point.

However, the above-mentioned conventional art has the following disadvantages.

If the mobile subscriber station (MSS) performs the handover from a current network to a new network according to the conventional art, it must access the new network, must wait for a broadcast message to be generated from the new network, and must receive the broadcast message from the new network, such that it can recognize system information required for connecting the new network.

In other words, after transmitting the "Link Connect" command for accessing the new network, the mobile subscriber station (MSS) receives control information broadcast from the new network, and finishes the handover procedure.

However, the mobile subscriber station (MSS) for attempting to perform the handover requires a delay time consumed for receiving a broadcast message from the new network, such that the handover may also be unavoidably delayed due to the delay time.

SUMMARY OF THE INVENTION

Accordingly, the present invention is directed to a method for transmitting/receiving control information of multi-mode mobile terminal that substantially obviates one or more problems due to limitations and disadvantages of the related art.

An object of the present invention is to provide a communication method capable of quickly terminating a handover between heterogeneous networks.

Another object of the present invention is to provide a method for effectively updating/acquiring control information for the handover between heterogeneous networks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting/receiving control information of a multi-mode mobile subscriber station (MSS) including at least two interfaces, comprising: a) requesting first control information, associated with a new access point detected by a link scanning, from a network entity for providing information associated with a specific network; b) acquiring the requested first control information and second control information supplied from the new access point; and c) performing a connection to the new access point according to the first control information and the second control information.

In another aspect of the present invention, there is provided a method for transmitting/receiving control information of a multi-mode mobile subscriber station (MSS) including at least two interfaces, comprising: informing a current access point of a handover fact, and requesting first control information associated with a new access point from the current access point; acquiring the requested first control information and second control information supplied from the new access point; and performing a connection to the new access point according to the first control information and the second control information, wherein the first control information stored in the current access point is received from a network entity for providing information associated with a specific network.

In yet another aspect of the present invention, there is provided a method for transmitting/receiving control information of a multi-mode mobile subscriber station (MSS) including at least two interfaces, comprising: informing a current access point of a handover fact, and requesting first control information associated with a new access point from the current access point; acquiring the first control information transmitted from the new access point to the current access point; acquiring second control information from the new access point; and performing a connection to the new access point according to the first control information and the second control information.

In yet another aspect of the present invention, there is provided a method for transmitting/receiving control information for a handover at a specific access point contained in a communication system for providing at least two interfaces, comprising: receiving a message for acquiring control information associated with the specific access point from a multi-mode mobile subscriber station (MSS); requesting the control information from a network entity for providing information of a specific network, and acquiring the requested control information; and providing the multi-mode mobile subscriber station (MSS) with the control information.

It is to be understood that both the foregoing general description and the following detailed description of the present invention are exemplary and explanatory and are intended to provide further explanation of the invention as claimed.

The method for transmitting/receiving control information of the multi-mode mobile subscriber station (MSS) according to the present invention has the following effects.

When a multi-mode mobile subscriber station (MSS) including at least two wired/wireless interfaces performs the media independent handover, it pre-acquires system parameter information associated with a new access point from the information server, and quickly restarts a communication mode.

The present invention provides a method for updating information stored in the information server to increase the reliability of the information. There is no limitation in interfaces capable of being supported by the multi-mode mobile subscriber station (MSS). For example, a broadband wireless access system (IEEE 802.16) interface, a wired LAN (IEEE 802.3) interface, a wireless LAN (IEEE 802.11) interface, or a cellular (3GPP/3GPP2) interface can be used as the above-mentioned interface supported by the multi-mode mobile subscriber station (MSS).

For example, the present invention may provide system parameter information via the information server based on the IEEE 802.21. For example, in the case of the IEEE 802.15 system, system parameter information may include UCD, DCD, DIUC, and UIUC, etc. In the case of the 3GPP, system parameter information may include a system information block (SIB). In the case of the 3GPP2, the system parameter information may include a system parameter message and an extended system parameter message, etc.

The present invention provides the handover candidate system (or the new access point) including a certain system parameter.

In conclusion, the present invention provides a method for updating information when the access point changes system parameters or handover-associated information in the information server. The present invention provides a method for allowing the MIHF of the mobile subscriber station (MSS) to acquire access-point-associated system parameter information stored in the information server, and provides a method for receiving a system parameter of a new access point or handover-associated parameters. As a result, a network access time during which the mobile subscriber station (MSS) gains access to the network for the handover can be reduced.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE PREFERRED EMBODIMENTS

Figure 1:
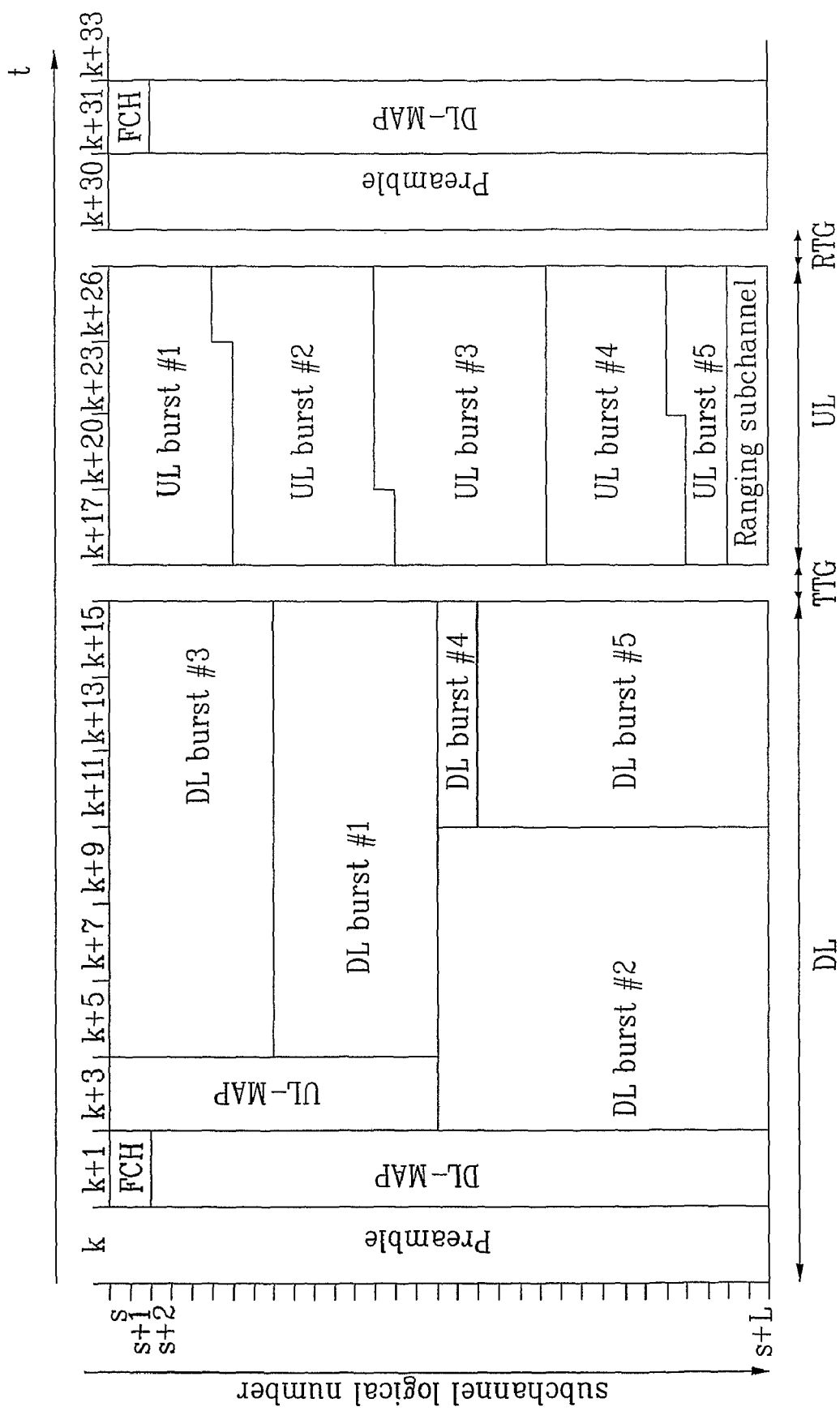
FIG. 1 is a conceptual diagram illustrating a frame structure of an OFDMA physical layer of a broadcast wireless access system according to the present invention.
Figure 2:
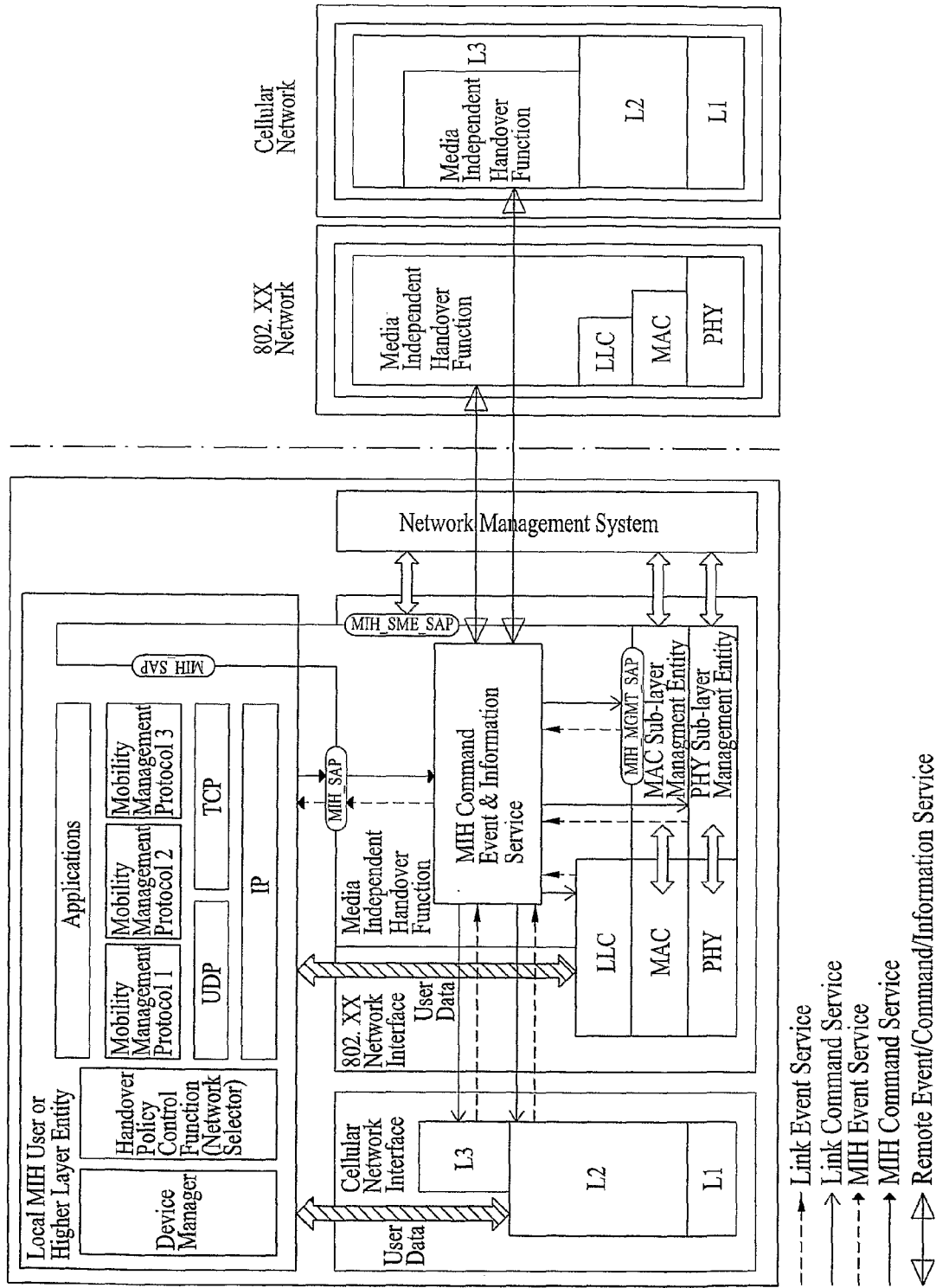
FIG. 2 is a circuit diagram illustrating a multi-mode mobile subscriber station (MSS) according to the present invention.
Figure 3:
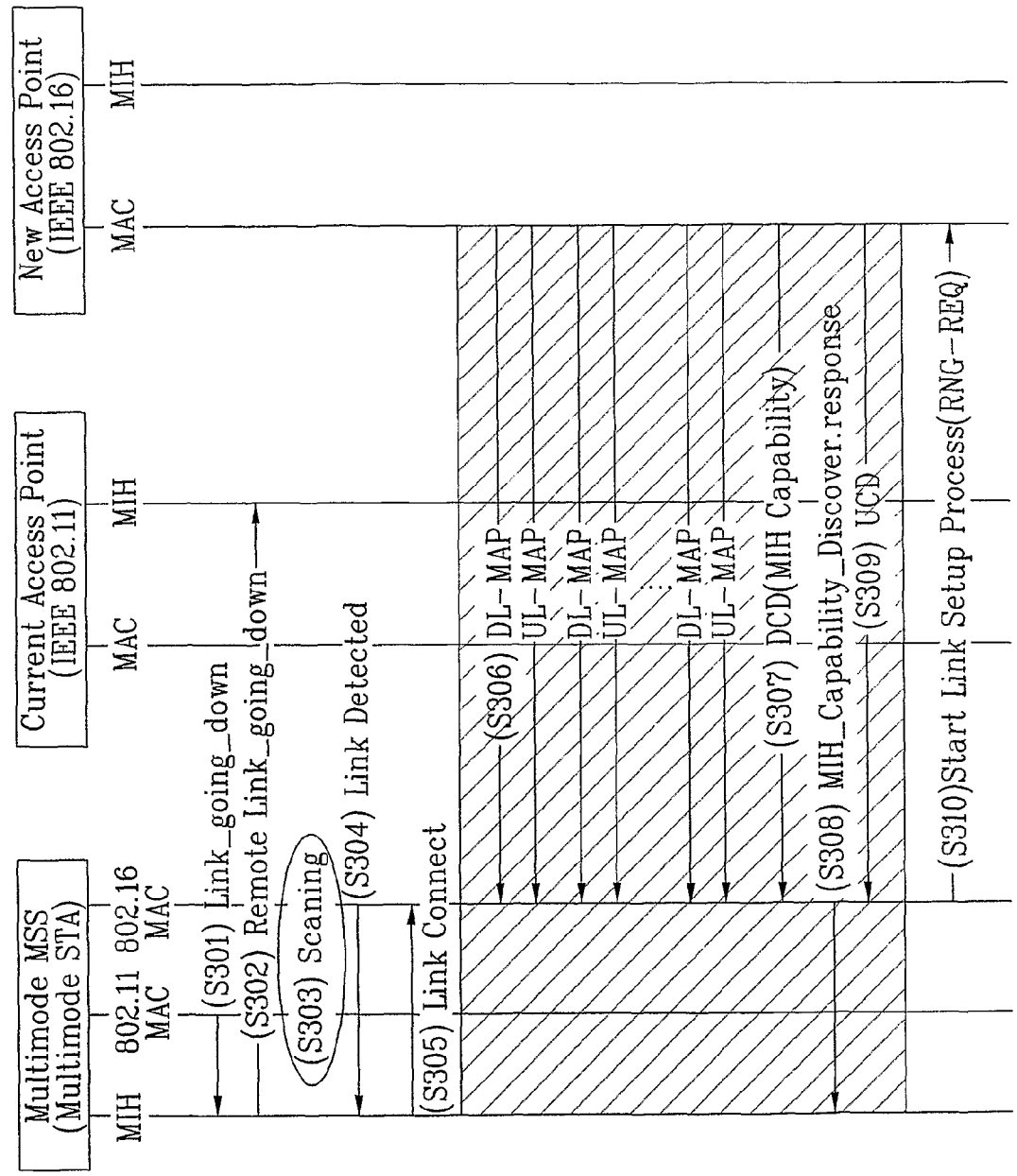
FIG. 3 is a flow chart illustrating a handover procedure according to a conventional art.

Reference will now be made in detail to the preferred embodiments of the present invention, examples of which are illustrated in the accompanying drawings. Wherever possible, the same reference indexes will be used throughout the drawings to refer to the same or like parts.

Prior to describing the present invention, it should be noted that the present invention provides an information element (IE) including control information associated with a specific access point, and proposes a plurality of primitives including the above-mentioned information element (IE). Also, the present invention provides a method for acquiring/updating control information for the handover using several primitives. If the method for acquiring/updating control information for the handover using several primitives is performed, the increasing delay time caused by the conventional art may be removed.

The present invention relates to a handover method between heterogeneous networks, and provides an information element (IE) proposed by the information server.

The "PoA_SystemParameter" IE (Information Element) will hereinafter be described as a representative example of the information element (IE).

The above-mentioned information element (IE) is stored in the information server. The above-mentioned information element (IE) may be transmitted to a destination upon receiving a request from the mobile subscriber station (MSS) or the access point. The above-mentioned information element (IE) can be acquired before the mobile subscriber station (MSS) attempts to perform the handover. The information server is indicative of a network entity for providing the above-mentioned services.

The following information element (IE) relates to a specific case in which a candidate network is a broadband wireless access system.

The candidate network is indicative of either one of networks at which the mobile subscriber station (MSS) attempting to perform the handover is newly connected. It should be noted that there is no limitation in the candidate networks according to the present invention.

In other words, the network including the wired interface such as the Ethernet may serve as the candidate network. A network including a wireless interface such as a wireless LAN or cellular mobile communication (e.g., 3GPP or 3GPP2) may serve as the candidate network.

For the convenience of description, a preferred embodiment in which the broadband wireless access system from among a variety of networks is used as the candidate network will hereinafter be described.

If the mobile subscriber station (MSS) pre-acquires the above-mentioned UCD and DCD information from the information server in the broadband wireless access system, the procedure for finding the MIH performance can be executed by the DCD information. Also, upon receiving the DL-MAP and UL-MAP messages from the base station (BS), the mobile subscriber station (MSS) can perform the L2 handover for a corresponding base station (BS).

In brief, if the candidate network is the above-mentioned broadband wireless access system, the information element (IE) includes a variety of control information required for the handover and access to the broadband wireless access system.

In order to access the broadband wireless access system, the mobile subscriber station (MSS) requires the above-mentioned DCD, UCD, DIUC, and UIUC information element (IE). Preferably, the above-mentioned information element (IE) may include the DCD, UCD, DIUC, and UIUC information element (IE).

If the candidate network is a specific communication network, control information element (IE) required when the mobile subscriber station (MSS) is handed over to the above-mentioned specific communication network, such that it is preferable that the above-mentioned information element (IE) according to the present invention may include the control information required for the handover or access to the specific communication network.

For example, if the candidate network is the 3GPP system, the information element (IE) may include an indicator of the system information block, the master information block including scheduling information element (IE), and at least one system information block.

If the candidate network is the 3GPP2 system, all or some parameters contained in the system parameter message (SPM) may be contained in the above-mentioned information element (IE).

Exemplary "PoA_SystemParameter IE" formats are shown in the following Table 9:

TABLE 9

POA specific information

| No. | Name of Information Element | Description | Representation | Length |
|---|---|---|---|---|
| 3.7 | Type_IE_POA_SystemParameters | Information about the network that are available | For example, DCD, UCD, DIUC, UIUC | variable |

Table 9 shows an example of the "PoA_SystemParameter IE" format according to the present invention.

Since Table 9 includes the DCD, UCD, DIUC, and UIUC information, the "PoA_SystemParameter IE" format can be preferably used when the candidate network acts as the broadband wireless access system.

Another preferred embodiment of the information element (IE) stored in the information service will hereinafter be described in detail. According to this preferred embodiment, if the candidate network includes not only the broadband wireless access system but also the 3GPP and 3GPP2 system, the information element (IE) includes a system parameter of a corresponding system.

The above-mentioned preferred embodiment of the "PoA_SystemParameter IE" format is shown in the following Table 10:

TABLE 10

PoA specific information

| No. | Name of Information Element | Description | Reference |
|---|---|---|---|
| xx | Type_IE_POA_SystemParameters | System parameters supported by the link layer of given PoA | System parameters (See Table 11) |

As can be seen from Table 10, the "PoA_SystemParameter" IE includes at least one system parameter. A detailed description of the system parameters will hereinafter be described in detail.

Exemplary structure of system parameters contained in the "PoA_SystemParameter" IE is shown in the following Table 11:

TABLE 11

Type = Type_IE_SystemParameters        Length = Variable
System Parameter Value[Variable] (see table 12)

And, detailed system parameter values are shown in the following Table 12:

TABLE 12

| Syntax | Length (Octet) | Notes |
|---|---|---|
| SystemParameter Value | Variable | This value includes system parameters supported on the network type. Network type: IEEE 802.16, 3gpp, 3gpp2, etc. IEEE 802.16 - UCD, DCD, UIUC, DIUC 3gpp -Master Information Block, System Info. 3gpp2 -(Extended) system parameter Mesage (See Table 13) |

As can be seen from Table 12, the network type may include the IEEE 802.16, 3gpp, and 3gpp2 information element (IE), etc.

If the network type is set to the IEEE 802.16, the system parameters may include the DCD, UCD, DIUC, and UIUC information element (IE) as stated above.

If the network type is set to the "3gpp" the system parameters may include a master information block and at least one system information block.

If the network type is set to the "3gpp2" the system parameters may include all or some parameters contained in either a system parameter message (SPM) or an extended SPM.

An exemplary system information block contained in the system parameters when the network type is the 3gpp may include a master information block, a first scheduling block, a second scheduling block, and at least one system information block (Types 1~18).

If the network type is set to the 3gpp2, exemplary system parameter messages capable of being contained in the system parameters are shown in the following Table 13:

TABLE 13

| Field | Length(bits) |
| --- | --- |
| PILOT_PN | 9 |
| CONFIG_MSG_SEQ | 6 |
| SID | 15 |
| NID | 16 |
| REG_ZONE | 12 |
| TOTAL_ZONES | 3 |
| ZONE TIMER | 3 |
| MULT_SIDS | 1 |
| MULT_NIDS | 1 |
| BASE_ID | 16 |
| BASE_CLASS | 4 |
| BASE_CHAN | 3 |
| MAX_SLOT_CYCLE_INDEX | 3 |
| HOME_REG | 1 |
| FOR_SID_REG | 1 |
| FOR_NID_REG | 1 |
| POWER_UP_REG | 1 |
| POWER_DOWN_REG | 1 |
| PARAMETER_REG | 1 |
| REG_PRD | 7 |
| BASE_LAT | 22 |
| BASE_LONG | 23 |
| REG_DIST | 11 |
| SRCH_WIN_A | 4 |
| SRCH_WIN_R | 4 |
| NGHBR_MAX_AGE | 4 |
| PWR_REP_THRESH | 5 |
| PWR_REP_FRAMES | 4 |
| PWR_THRESH_ENABLE | 1 |
| PWR_PERIOD_ENABLE | 1 |
| PWR_REP_DELAY | 5 |
| RESCAN | 1 |
| T_ADD | 6 |
| T_DROP | 6 |
| T_COMP | 4 |
| T_TDROP | 4 |
| EXT_SYS_PARAMETER | 1 |
| EXT_NGHBR_LST | 1 |
| GEN_NGBR_LST | 1 |
| GLOBAR_REDIRECT | 1 |
| PRI_NGHBR_LST | 1 |
| USER_ZONE_ID | 1 |
| EXT_GLOBAL_REDIRECT | 1 |
| EXT_CHAN_LST | 1 |
| T_TDROP_RANGE_INCL | 1 |
| T_TDROP_RANGE | 1 |
| NEG_SLOT_CYCLE_INDEX_SUP | 1 |

The above-mentioned PoA_SystemParameter (IE) is contained in a variety of primitives. In order to support the high-speed handover, the above-mentioned preferred embodiment employs improved primitives better than those of the conventional art.

A variety of primitives (e.g., "Link_Parameter_Change.Indication" primitive, "MIH_Get_Information.response" primitive, "MIH_Handover_Initiate.response" primitive, "MIH_Handover_Prepare.response" primitive, "Update_Info_Query.request" primitive, and "Update_Info_Query.response" primitive) according to the above-mentioned preferred embodiment of the present invention will hereinafter be described.

The "Link_Parameter_Change.Indication" primitive will hereinafter be described in detail.

The "Link_Parameter_Change.Indication" primitive is adapted to inform a user of a variation of link parameters escaping from a specific threshold value. The "Link_Parameter_Change.Indication" primitive includes link-layer parameters (e.g., a link speed, a QoS, or a BER). The threshold value of each link layer parameter is set to a threshold value prescribed in the "Link Configure Threshold" command.

If the candidate network is set to the broadband wireless access system, it may include the changed DCD and UCD information received from the MAC layer in the "POA_SystemParameters", such that the resultant information may be transmitted to a destination.

Also, the "POA_SystemParameters" may include all the changed information associated with the handover or network access along with the above-mentioned UCD and DCD information.

For example, if the candidate network is the 3gpp system, the 3gpp system may include the master information block and at least one system information block corresponding to the master information block.

If the candidate network is the 3gpp2 system, the 3gpp2 system may include all or some parameters contained in either a system parameter message (SPM) or an extended SPM.

The "POA_SystemParameters" parameter may be contained in the "LinkParameterList" parameter, and is then transmitted to a destination. For example, the system parameter information changed when the "POA_SystemParameters" parameter is contained in the "newValueofLinkParameter" parameter from among the LinkParameterList may be transmitted to an upper layer.

The "LinkParameterList" and "POA_SystemParameters" information is transmitted from the MAC layer to the MIH, and is changed by communicating with the information server, such that it may be used to request the update process from the information server.

The above-mentioned primitives may include the information as shown in the following Table 14:

TABLE 14

| Name | Type | Valid Range | Description |
| --- | --- | --- | --- |
| Source Identifier | Identifier | Any Valid individual or group identifier | The identifier of entity where the request is initiated, this filed may be optionally left empty if the command is local. |
| Destination Identifier | Identifier | MIH_Local MIH_REMOTE | The destination identifier request or response. This is the identifier of local or peer MIH function. |

TABLE 14-continued

| Name | Type | Valid Range | Description |
| --- | --- | --- | --- |
| CurrentLinkIdentifier | NetworkIdentifier. Maybe one of different 802 and Celluar networks | N/A | This identifies the current access network over which the command needs to be sent. This is valid only for remote commands which need to be sent to remote MIHF. The command is then sent either at L2 or at L3 |
| ResourceStatus | Enumerate | N/A | Specifies whether requested resources are available or not at the new POA. |
| AvailableResourceList | List | N/A | List of resources actually available at the new suggested network and the new network POA. |
| POA_SystemParameters | | | For IEEE802.16,DCD, UCD, DIUC, UIUC, etc For GPP, Master information Block, System Information Blocks(type 1-18), etc For #3GPPS (Extended)System Parameter Message, etc. |

The "MIH_Get_Information.response" primitive will hereinafter be described in detail.

The "MIH_Get_Information.request" primitive is adapted to allow the MIH of the mobile subscriber station (MSS) to request necessary information, or is adapted to allow an MIH of the access point to request information from a counterpart MIH entity, such that it can acquire the value associated with a network performance or the value associated with a specific interface.

The "MIH_Get_Information.response" primitive is adapted to allow either the mobile subscriber station (MSS) or the access point to acquire the handover- or network access-information contained in the "POA_SystemParameters" information element from the information server.

3gpp2 system, the "POA_SystemParameters" information element (IE) may include all or some parameters contained in either the system parameter message (SPM) or the extended SPM.

The "MIH_Get_Information.request" primitive may be transmitted to the information server via a current access point, or may also be directly transmitted from the mobile subscriber station (MSS) to the information server. The information server includes the information requested by the "MIH_Get_Information.response" primitive, and replies to the mobile subscriber station (MSS).

The above-mentioned primitives may include specific information shown in the following Table 15:

TABLE 15

| Name | Type | Valid Range | Description |
| --- | --- | --- | --- |
| InfoQueryType | An integer value corresponding to one of the following types: 1: TLV 2: RDF_DATA 3: RDF_SCHEMA_URL 4: RDF_SCHEMA | N/A | The type of query that is specified |
| InfoQueryParameters (e.g. POA_SystemParameters) | Query type specific parameters | N/A | Query type specific parameters which indicate the type of information the client may be interested in. |

The broadband wireless access system receives the DCD and UCD information from the MAC layer, and includes the DCD and UCD information in the "POA_SystemParameters" information element of the "MIH_Get_Information.response" primitive, such that the resultant information is transmitted to a desired destination.

As described above, the "POA_SystemParameters" information element (IE) may include not only the UCD or DCD information but also other changed information element (IE).

In the case of the 3gpp system, the "POA_SystemParameters" information element (IE) may include a master information block and at least one system information block corresponding to the master information block. In the case of the The "MIH_Handover_Initiate.response" primitive will hereinafter be described in detail.

The "MIH_Handover_Initiate.response" primitive is adapted to allow an MIH function of the mobile subscriber station (MSS) to communicate with an MIH function of the network. The "MIH_Handover_Initiate.response" primitive is used to transmit specific information indicating the handover initiation. The "MIH_Handover_Initiate.response" primitive may also be used when the network communicates with the mobile subscriber station (MSS) to initiate the handover.

According to this preferred embodiment of the present invention, specific information is added to the above-mentioned "MIH_Handover_Initiate.response" primitive. In this case, the specific information is indicative of at least one of a system parameter associated with "PreferredNewPoA" information of the MSS, and information requested by the MSS for the handover.

If the candidate network is indicative of the broadband wireless access system, the DCD and UCD information is contained in the POA_SystemParameters" information element (IE), and is transmitted to a destination.

As described above, the "POA_SystemParameters" information element (IE) may include not only the UCD and DCD information but also any changed information associated with the handover or network access.

Although the candidate network is set to the broadband wireless access system or any other system (i.e., 3gpp or 3gpp2), the information element (IE) may include the system parameter of a corresponding system or specific information required for the handover or initial network access.

If the mobile subscriber station (MSS) transmits a message including the "POA_SystemParameters" information element (IE) to a current access point, the current access point may communicate with either the information server or the "PreferredNewPoA" such that it can acquire a necessary information element (IE) from the information server or the "PreferredNewPoA".

The above-mentioned "MIH_Handover_Initiate.response" primitive has specific information shown in the following Table 16:

The "MIH_Handover_Prepare.response" primitive will hereinafter be described in detail.

The "MIH_Handover_Prepare.response" primitive is adapted to allow the MIH of a current access point to communicate with the MIH of a counterpart entity.

If the handover is imminent, the "MIH_Handover_Prepare.response" primitive commands the counterpart entity (i.e., a handover candidate network) to prepare handover resources. The "MIH_Handover_Prepare.response" primitive is adapted to request/transmit resource status information element (IE) of the counterpart entity.

In order to quickly perform the handover, the above-mentioned preferred embodiment of the present invention further includes a parameter associated with the handover or a system parameter.

In more detail, if the candidate network is determined to be the broadband wireless access system, the UCD, DCD, UIUC, and DIUC information is added to the above-mentioned "MIH_Handover_Prepare.response" primitive.

The "POA_SystemParameters" information element (IE) may include a system parameter of a corresponding system or other information required for the handover or initial network access even when the candidate network is set to not only the broadband wireless access system or other systems (i.e, 3gpp and 3gpp2).

The "POA_SystemParameters" information element (IE) is transmitted to the "MIH_Handover_Initiate.response" primitive, such that it can be transmitted to the mobile subscriber station (MSS).

TABLE 16

| Name | Type | Valid Range | Description |
| --- | --- | --- | --- |
| Source Identifier | Identifier | Any valid individual or group identifier | The identifier of entity where the request is initiated. This field may be optionally left empty if the command is local |
| Destination Identifier | identifier | MIH_LOCAL, MIH_REMOTE | The destination identifier of request or response. This is the identifier of local or peer MIH Function. |
| CurrentLinkIdentifier | Network Identifier. Can be one of Different 802 and Cellular networks. | N/A | This identifies the current access network over which the command needs to be sent. This is valid only for remote commands which need to be sent to remote MIHF. The command is then sent either at L2 or at L3. |
| PreferredLinkIdentifier | Network Identifier. Can be one of different 802 and Cellular networks | | This is the identifier of new network to which handover needs to be initiated. |
| PreferredPoAIdentifier | MAC_ADDRESS (Optional) | | This is the preferred Point of Attachment(AP/BS) on new Network |
| HandoverAck | Boolean | | 1: Initiate Handover 0: Abort Handover If the handover has to be aborted then a reason code is provided |
| AbortReason | Enumerate | N/A | List the reason for aborting/declining the handover request |
| Available Resource List POA_SystemParameters | Boolean | N/A | List of available sources on new link For IEEE 802.16, DCD, UCD, DIUC, UIUC, etc For GPP, Master Information Block, System Information Blocks For 3GPP2, (Extended) System Parameter message, etc |

The above-mentioned "MIH_Handover_Prepare.response" primitive has specific information shown in the following Table 17:

The "Update_Info_Query.request" primitive may include a specific information element (IE) shown in the following Table 18:

TABLE 17

| Name | Type | Valid Range | Description |
| --- | --- | --- | --- |
| Source Identifier | Identifier | Any valid individual or group identifier | The identifier of entity where the request is initiated. This field may be optionally left empty if the command is local |
| Destination Identifier | Identifier | MIH_LOCAL, MIH_REMOTE | The destination identifier of request or response. This is the identifier of local or peer MIH Function. |
| CurrentLinkIdentifier | Network Identifier Maybe one of different 802 and Cellular networks | N/A | This identifies the current access network over which the command needs to be sent. This is valid only for remote commands which need to be sent to remote MIHF. The command is then sent either at L2 or at L3. |
| ResourceStatus | Enumerate | N/A | Specifies whether requested resources are available or not at the new PoA |
| AvailableResourceList | List | N/A | List of resources actually available at the new suggested networks and the new networkPoA |
| POA_SystemParameters | | | For IEEE 802.16, DCD, UCD, DIUC, UIUC, etc For 3GPP, Master Information Block, System Information Blocks (Type 1-18), etc For 3GPP2, (Extended) System Parameter Message, etc |

The "Update_Info_Query.request" primitive will hereinafter be described in detail.

The "Update_Info_Query.request" primitive is used when each access point or each mobile subscriber station (MSS) requests the information server to update the changed information elements (IEs), such that it can communicate with the information server via either one of each access point, an MIH of the mobile subscriber station (MSS), and a network entity (e.g., IP or transport layer) of the access point. If the information is updated at each access point, the mobile subscriber station (MSS) can receive a reliable information element before initiating the handover. An information element (IE) to be updated is inserted into the "InfoQueryParameters" information element (IE).

The broadband wireless access system receives the changed DCD and UCD information from the MAC layer, and includes the changed DCD and UCD information in the "POA_SystemParameters" parameter, such that the resultant information element (IE) is transmitted to a destination. The "Update_Info_Query.request" primitive may include not only the above-mentioned information element (IE) but also all kinds of changed information associated with the handover or network access.

In addition to the above-mentioned information element (IE) of the broadband wireless access system, the "Update_Info_Query.request" primitive may also include other changed system parameters associated with other candidate network systems (i.e., 3gpp and 3gpp2).

TABLE 18

| Name | Type | Valid Range | Description |
| --- | --- | --- | --- |
| SourceIdentifier | Identifier | | The identifier of entity where the request is initiated. |
| DestinationIdentifier | Identifier | | The destination identifier of request or response |
| InfoQueryParameters | Query type specific parameters | N/A | Query type specific parameters which indicated the type of information the client wants to update (e.g., UCD/DCD) (e.g., POA_SystemParameters) |

The "Update_Info_Query.response" primitive will hereinafter be described in detail.

The "Update_Info_Query.response" primitive is used as a response message of the "Update_Info_Query.request" primitive, such that it transmits the result indicating whether the information update process has been successfully performed to the information server.

The "Update_Info_Query.response" primitive includes specific information shown in the following Table 19:

TABLE 19

| Name | Type | Valid Range | Description |
|---|---|---|---|
| SourceIdentifier | Identifier | | The identifier of entity where the request is initiated. This field may be filled with the identifier of the information server |
| DestinationIdentifier | Identifier | | The destination identifier of request or response |
| InfoQueryParameters | Query type specific parameters | N/A | Query type specific parameters which indicate the type of information the client wants to update (e.g., POA_SystemParameters) |
| Resultcode | Enumerate | | 0: success 1: Fail |

A method for performing the handover using the above-mentioned primitives will hereinafter be described in detail.

Figure 4:
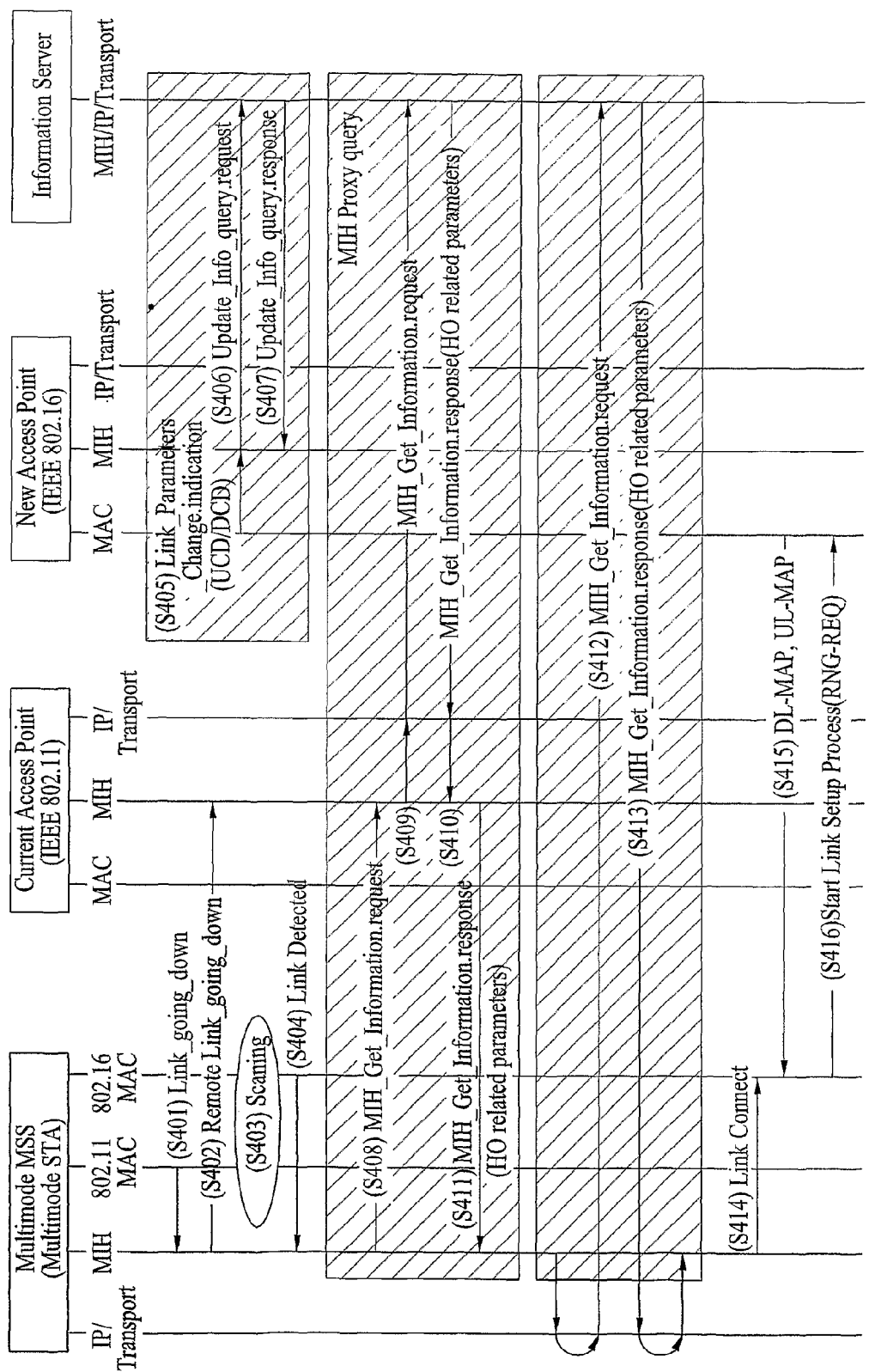
FIG. 4 is a flow chart illustrating a handover procedure according to a first preferred embodiment of the present invention.

FIG. 4 is a flow chart illustrating a handover method according to the present invention.

Referring to FIG. 4, if the multi-mode mobile subscriber station (MSS) is handed over from a wireless LAN system to a broadband wireless access system, a plurality of access points can request the information server to update the changed information element (IE). According to the preferred embodiment of FIG. 4, the mobile subscriber station (MSS) or the current access point can acquire the changed information element (IE) of a new access point from the information server.

In FIG. 4, the current access point is set to the wireless LAN system (i.e., IEEE 802.11), and the new access point is set to the broadband wireless access system (i.e., IEEE 802.16).

The present invention relates to a handover between heterogeneous networks. It should be note that there is no limitation in the handover between heterogeneous networks.

As can be seen from FIG. 4, the broadband wireless access system is used as a new access point, such that the information element (IE) according to the present invention may include a variety of information (e.g., DCD, UCD, DIUC, and UIUC—associated information) required for the handover or access.

The 3gpp system may include at least one system information block type (SIT) including a master information block. The 3gpp2 system may include all or some parameters contained in either a system parameter message (SPM) or an extended SPM.

As can be seen from FIG. 4, the MIH of the multi-mode mobile subscriber station (MSS) receives specific information from the link layer at step S401. This specific information indicates that a connection to a current access wireless LAN link will be released after the lapse of a predetermined time.

If the mobile subscriber station (MSS) recognizes the above-mentioned connection-release status, its MIHF transmits the "Link_going_down" primitive indicating that the connection will be remotely released at the MIH of the current access point at step S402.

The upper management entity of the mobile subscriber station (MSS) generates a command for scanning another link, such that it can be handed over from a current network to another network using the command. The above-mentioned command is transmitted to a corresponding interface link layer over the MIHF, and scans the actual link at step S403.

The broadband wireless access link scanned by the scan procedure S403 is transmitted to the MIHF via the "Link Detected" primitive at step S404.

Steps S405~S407 independently performed separated from the above-mentioned S401~S404 will hereinafter be described in detail. The steps S405~S407 relate to a method for informing the information server of the changed information element (IE) at a specific access point.

If there is a variation of a specific physical-layer parameter at a new access point, the changed information content is notified to the information server. For this purpose, if the physical layer parameters (e.g., UCD and DCD) are changed to others, the broadband wireless access system link layer of FIG. 4 transmits the changed information element (IE) to the MIHF or the upper entity via the "PoA_SystemParameters" information element (IE) at step S405.

Upon receiving the changed information element (IE), the MIHF or the upper entity stores the changed information element (IE) in a specific storage unit using an information update request or response at steps S406 and S407.

The above-mentioned steps S405~S407 for updating the system parameter or the handover-associated parameter in the information server by the broadband wireless access system can be performed irrespective of other processes. In other words, the steps S406 and S407 can be performed at any time at which the upper entity receives the changed information of the link layer.

The following steps S408~S411 describe a method for requesting the handover- and access-information from the information server at a current access point.

The following steps S412~S413 describe a method for directly requesting desired information element (IE) from the information server. The steps S408~S411 can be performed independently of the steps S412~S413.

The steps S408~S411 will hereinafter be described in detail.

The multi-mode mobile subscriber station (MSS) transmits the "MIH_Get_Information.request" primitive to the current access point at step S408, such that it can request much more information (e.g., system parameters (UCD, DCD, and SIB) of the new access point) associated with a link of the new access point (i.e., a broadband wireless access system) at step S408.

The current access point transmits a question generated by the "MIH_Get_Information.request" primitive to the information server, such that it requests handover information element (IE) from the new access point at step S409.

The information server receives response information to the question from the mobile subscriber station (MSS), includes the received response information element (IE) in the primitive, and transmits the resultant information element (IE) to the mobile subscriber station (MSS). In other words, the information server transmits the response to the question of the mobile subscriber station (MSS) to the current access point via the "MIH_Get_Information.response" primitive at step S410, and the above-mentioned response information is transmitted to the last mobile subscriber station (MSS) at step S411, such that the information transmission is completed.

The control information required for the handover or access is contained in the information server, and may further include the physical layer parameters (UCD or DCD) updated by the steps S405~S407.

Steps S412~S413 will hereinafter be described in detail.

The MIHF of the mobile subscriber station (MSS) directly transmits the question generated by the "MIH_Get_Information.request" and "MIH_Get_Information.response" primitives to the information server using the 3-layer (L3) transport, such that the new access point can acquire the updated information server at step S412 and S413.

The MIHF of the mobile subscriber station (MSS) transmits the "Link Connect" command for 2-layer (L2) connection to the link of the new access point (i.e., the broadband wireless access system). In this case, the MIHF of the mobile subscriber station (MSS) can transmit the "Link Connect" command along with the information acquired from the information server at step S414.

The base station (BS) of the broadband wireless access system broadcasts the DL-MAP and UL-MAP message to the mobile subscriber station (MSS) at each frame, such that it transmits a variety of information associated with a frame structure of the data burst and band allocation information server at step S415.

The mobile subscriber station (MSS) acquires downlink and uplink MAP information, such that it recognizes the MIH capability information via the UCD and DCD information acquired from the information server. Since the mobile subscriber station (MSS) recognizes the initial ranging interval via the above-mentioned MAP information, the ranging process can be performed. The mobile subscriber station (MSS) executes the procedure for performing the 2-layer (L2) connection to the base station (BS) of the new access point at step S416.

Figure 5:
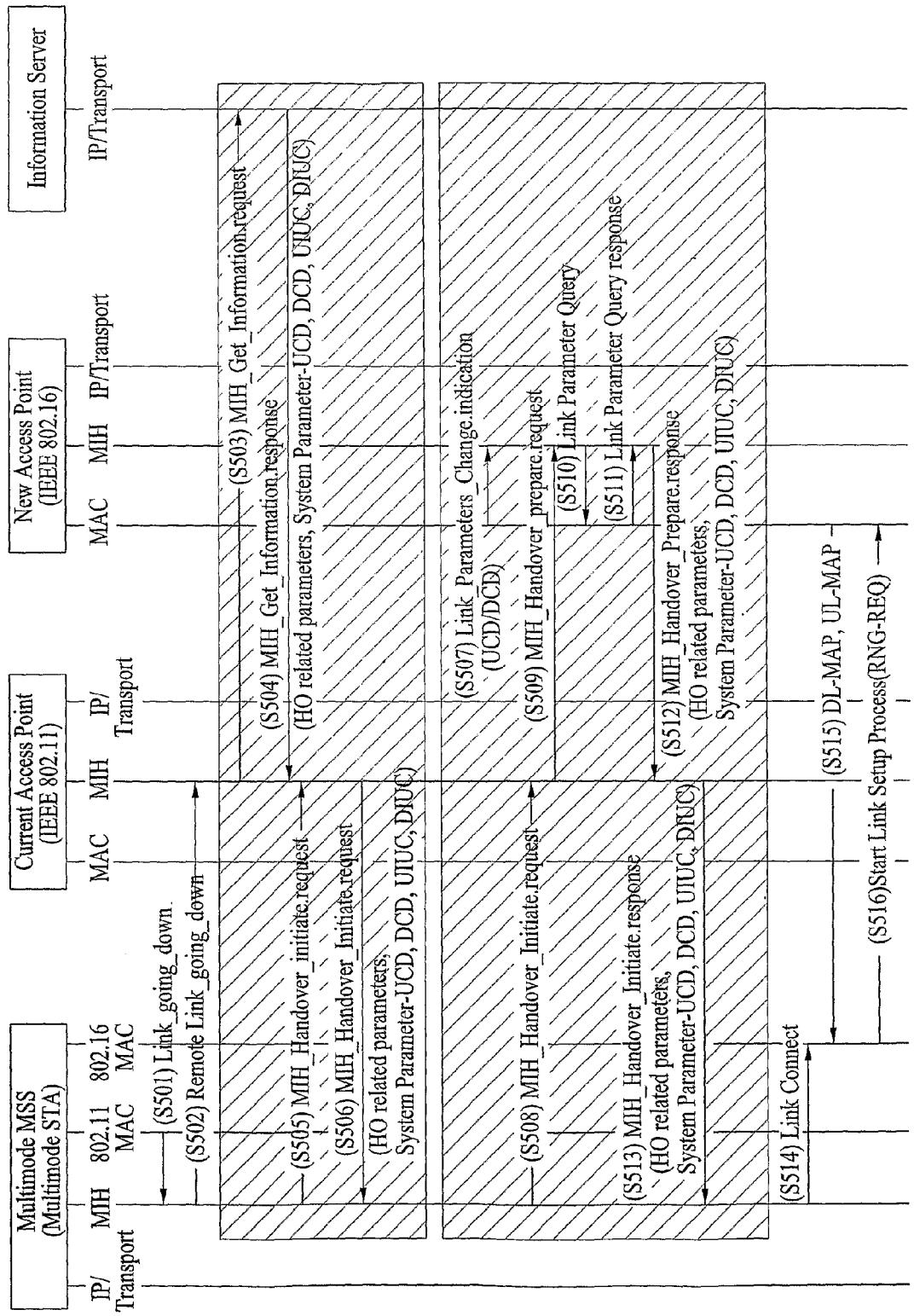
FIG. 5 is a flow chart illustrating a handover procedure according to a second preferred embodiment of the present invention.

FIG. 5 is a flow chart illustrating a handover method according to another preferred embodiment of the present invention.

FIG. 5 shows a method for acquiring information of a new access point via a current access point when a multi-mode mobile subscriber station (MSS) is handed over from a wireless LAN system to a broadband wireless access system.

As stated above, the current access point and the new access point are disclosed for only illustrative purposes, such that the current access point and the new access point may be indicative of a communication system capable of employing a variety of interfaces.

As can be seen from FIG. 5, the MIH of the multi-mode mobile subscriber station (MSS) receives specific information from the link layer at step S501. This specific information indicates that a connection to a current access wireless LAN link will be released after the lapse of a predetermined time.

The MIHF of the mobile subscriber station (MSS) transmits the "Link_going_down" primitive to the MIHF of the current access point, such that it informs the MIHF of the current access point that the connection will be remotely released. In this case, the above-mentioned primitive may include the MAC address of a new access point at step S502.

Two handover methods according to the present invention will hereinafter be described.

A first handover method is shown in steps S502~S506, in which the handover of the mobile subscriber station (MSS) is performed using control information acquired from the information server at the current access point.

A second handover method is shown in steps S507~S513, in which the handover of the mobile subscriber station (MSS) is performed using control information generated when the new access point is connected to the current access point. The steps S503~S506 can also be performed independently of the steps S507~S513.

Firstly, the steps S503~S506 will hereinafter be described.

If the current access point receives MAC address of the new access point, it transmits a question to the information server, and requests information associated with the new access point at step S503.

The above-mentioned information request of the new access point can be executed by including the information element (IE) in the "MIH_Get_Information.request" and "MIH_Get_Information.response" primitives.

The information server includes handover-associated information in the information element (IE), and transmits the resultant information to the current access point at step S504. For example, the broadband wireless access system includes the system parameters (e.g., UCD and DCD) in the information element (IE), and transmits a response message to the current access point at step S504.

As can be seen from FIG. 5, the present invention may include handover-associated parameters (i.e., HO related parameters) and access-associated parameters at steps S503~504, and this operation can be made available by the information element (i.e., PoA_SystemParameter IE) of the present invention.

The MIHF of the mobile subscriber station (MSS) transmits a variety of information to the MIHF of the current access point at step S505. In this case, the information received in the MIHF of the current access point includes a handover link identifier, an access-point identifier, and handover-trial information.

The current access point includes information of the broadband wireless access system link acquired from the information server, and replies to the handover trial.

Steps S507~S513 will hereinafter be described in detail.

If the physical layer parameters (e.g., UCD and DCD) are changed to others, the link layer of the broadband wireless access system base station transmits the changed information to the MIHF or an upper entity at step S507.

The step S508 shows an exemplary information acquisition method in which the mobile subscriber station (MSS) acquires information via the current access point using the above step S505.

The current access point receiving the handover initiation request informs the new access point that the mobile subscriber station (MSS) will be handed over to the new access point, such that it can guarantee necessary resources or current-available resources. Also, the above-mentioned current access point requests handover-associated parameters or physical-layer parameters at step S509.

The current access point (i.e., MIHF of the base station) receiving corresponding information request transmits a specific question associated with the physical layer parameter to the MAC layer, such that it acquires information at steps S510 and S511.

The new access point transmits actual-available resource information and the physical-layer parameter to the current access point at step 512. In this case, the physical-layer parameter is set to specific information including the UCD or DCD information in the case of the broadband wireless access system, is set to "SIB" in the case of the 3gpp system, or is set to at least one parameter contained in the system parameter message (SPM) in the case of the 3gpp2 system. The current access point transmits corresponding information as a response to the handover initiation of the mobile subscriber station (MSS) at step S513.

The resource-associated information may be transmitted to the mobile subscriber station (MSS) via the "MIH_Handover_Prepare.response" and "MIH_Handover_Initiate.response" primitives.

The MIHF of the mobile subscriber station (MSS) transmits the "Link Connect" command capable of connecting the L2 layer to the broadband wireless access system link layer using the acquired information at step S514.

The base station (BS) of the broadband wireless access system broadcast the UL-MAP and UL-MAP message to the mobile subscriber station (MSS) at each frame, such that it can transmit not only the frame structure for a data burst but also band allocation information at step S515.

The broadband wireless access system link layer of the mobile subscriber station (MSS) having received the MAP information recognizes not only the MIH capability information via the UCD and DCD message pre-acquired from the information server, but also the initial ranging interval via the MAP, such that it performs the procedure for connecting the L2 layer to the base station (BS) at step S516.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As apparent from the above description, the present invention provides a method for updating information when the access point changes system parameters or handover-associated information in the information server.

The present invention provides a method for allowing the MIHF of the mobile subscriber station (MSS) to acquire access-point-associated system parameter information stored in the information server, and provides a method for receiving a system parameter of a new access point or handover-associated parameters. As a result, a network access time during which the mobile subscriber station (MSS) gains access to the network for the handover can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting and receiving control information of a multi-mode mobile subscriber station (MSS) including at least two interfaces, the method comprising:
    transmitting, from a media independent handover (MIH) module of the multi-mode MSS, first information used for requesting information associated with a new access point, to a remote entity providing information service via a MIH module of a current access point; and
    receiving, at the MIH module of the multi-mode MSS, second information from the remote entity via the MIH module of the current access point,
    wherein the second information includes a network type of the new access point and parameters representing system information depending on the network type of the new access point, and
    wherein the parameters include at least one of a downlink channel descriptor (DCD)/uplink channel descriptor (DCD) of an IEEE 802.16 network, a system information block (SIB) of a 3GPP network, or a system parameters message of a 3GPP2 network.

2. The method according to claim 1, further comprising:
    discovering MIH capability of the new access point by using the parameters.

3. The method according to claim 2, further comprising:
    receiving resource allocation information, associated with uplink radio resources or downlink radio resources, broadcasted by the new access point.

4. The method according to claim 1, further comprising:
    acquiring the new access point by link scanning.

5. The method according to claim 3, further comprising:
    establishing a second layer (L2) connection to the new access point by using the parameters and the resource allocation information.

6. The method according to claim 1, wherein if the parameters are changed to other parameters, the new access point transmits information associated with the changed parameters to the remote entity, and requests an update process from the remote entity.

7. A multi-mode mobile subscriber station (MSS) including at least two interfaces, the multi-mode MSS comprising:
    a media independent handover (MIH) module configured to transmit first information used for requesting information associated with a new access point, to a remote entity providing information service, via a MIH module of a current access point, and to receive second information from the remote entity via the MIH module of the current access point,
    wherein the second information includes a network type of the new access point and parameters representing system information depending on the network type of the new access point, and
    wherein the parameters include at least one of a downlink channel descriptor (DCD)/uplink channel descriptor (UCD) of an IEEE 802.16 network, a system information block (SIB) of a 3GPP network, or a system parameters message of a 3GPP2 network.

8. The multi-mode MSS according to claim 7, wherein the parameters are used for discovering MIH capability of the new access point.

9. The multi-mode MSS according to claim 8, wherein resource allocation information associated with uplink radio resources or downlink radio resources is broadcasted by the new access point.

10. The multi-mode MSS according to claim 7, wherein the new access point is acquired by link scanning.

11. The multi-mode MSS according to claim 9, wherein a second layer (L2) connection to the new access point is established by using the parameters and the resource allocation information.

12. The multi-mode MSS according to claim 7, wherein if the parameters are changed to other parameters, the new access point transmits information associated with the changed parameters to the remote entity, and requests an update process from the remote entity.

* * * * *